No. 825,327. PATENTED JULY 10, 1906.
C. W. LARSON.
BRAKE.
APPLICATION FILED FEB. 19, 1904.

2 SHEETS—SHEET 1.

Witnesses:
George H. Tilden.
Helen Oxford

Inventor:
Carl W. Larson,
by Albert G. Davis
Att'y.

No. 825,327. PATENTED JULY 10, 1906.
C. W. LARSON.
BRAKE.
APPLICATION FILED FEB. 19, 1904.

2 SHEETS—SHEET 2.

Witnesses:
George H. Tilden
Helen Orford

Inventor:
Carl W. Larson,
by Albert G. Davis
Att'y.

UNITED STATES PATENT OFFICE.

CARL W. LARSON, OF SCHENECTADY, NEW YORK, ASSIGNOR TO GENERAL ELECTRIC COMPANY, A CORPORATION OF NEW YORK.

BRAKE.

No. 825,327.        Specification of Letters Patent.        Patented July 10, 1906.

Application filed February 19, 1904. Serial No. 194,317.

*To all whom it may concern:*

Be it known that I, CARL W. LARSON, a citizen of the United States, residing at Schenectady, in the county of Schenectady and State of New York, have invented certain new and useful Improvements in Brakes, of which the following is a specification.

My invention relates to magnetic brakes, and has for its object to provide a novel brake mechanism which may be operated by either alternating or direct current, which shall give the maximum braking power for the space occupied, and which shall be compact in structure and cheap to manufacture.

To this end it comprises certain novel features of construction. One of these consists in the radial arrangement of the brake-shoe magnets in combination with brake-shoes movable relative thereto, another in energizing the brake-shoe magnets from a single coil, and still another in employing a flanged outer element mounted upon the motor, so that the more complicated parts of the brake mechanism will be practically inclosed, and thereby protected from injury. These and other features of my invention will be best understood by reference to the following description, taken in connection with the accompanying drawings, in which I have shown one embodiment of the invention, and the parts, combinations, and improvements which I regard as my invention will be specifically pointed out in the appended claims.

Figure 1:
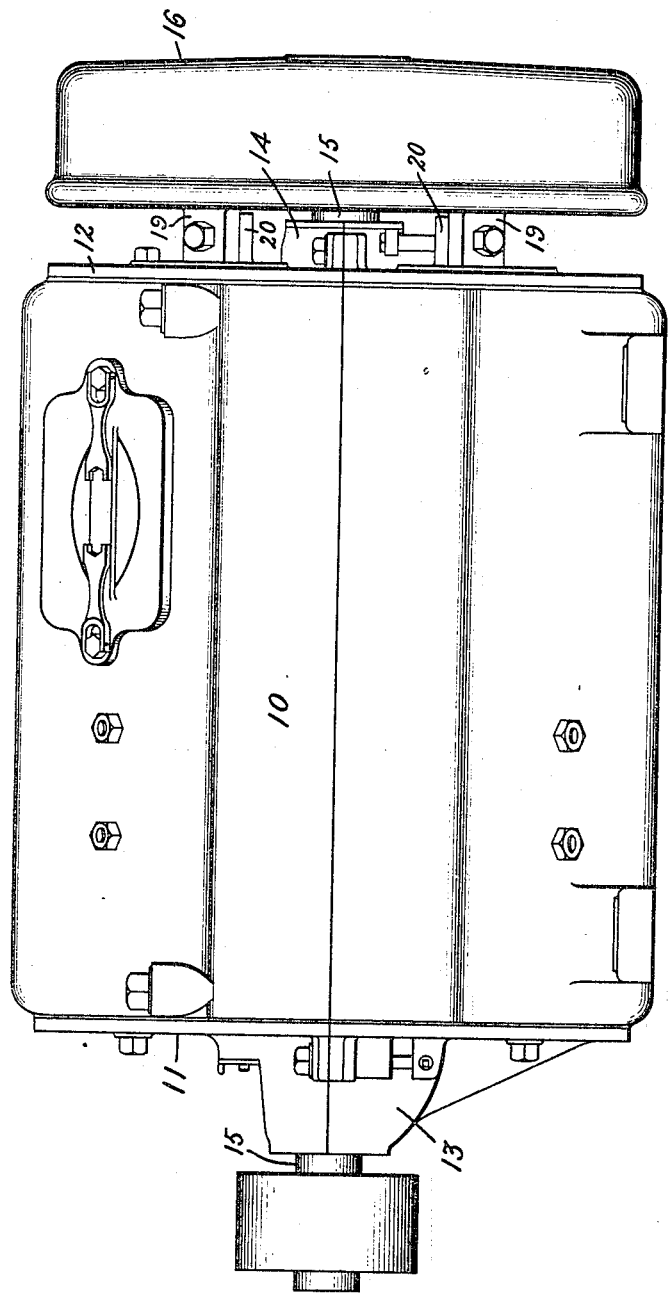
Figure 3:
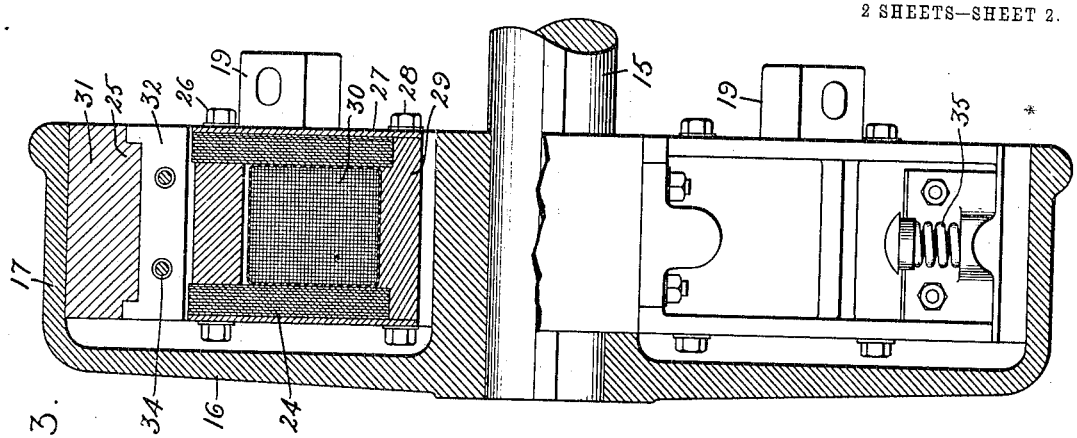
Figure 2:
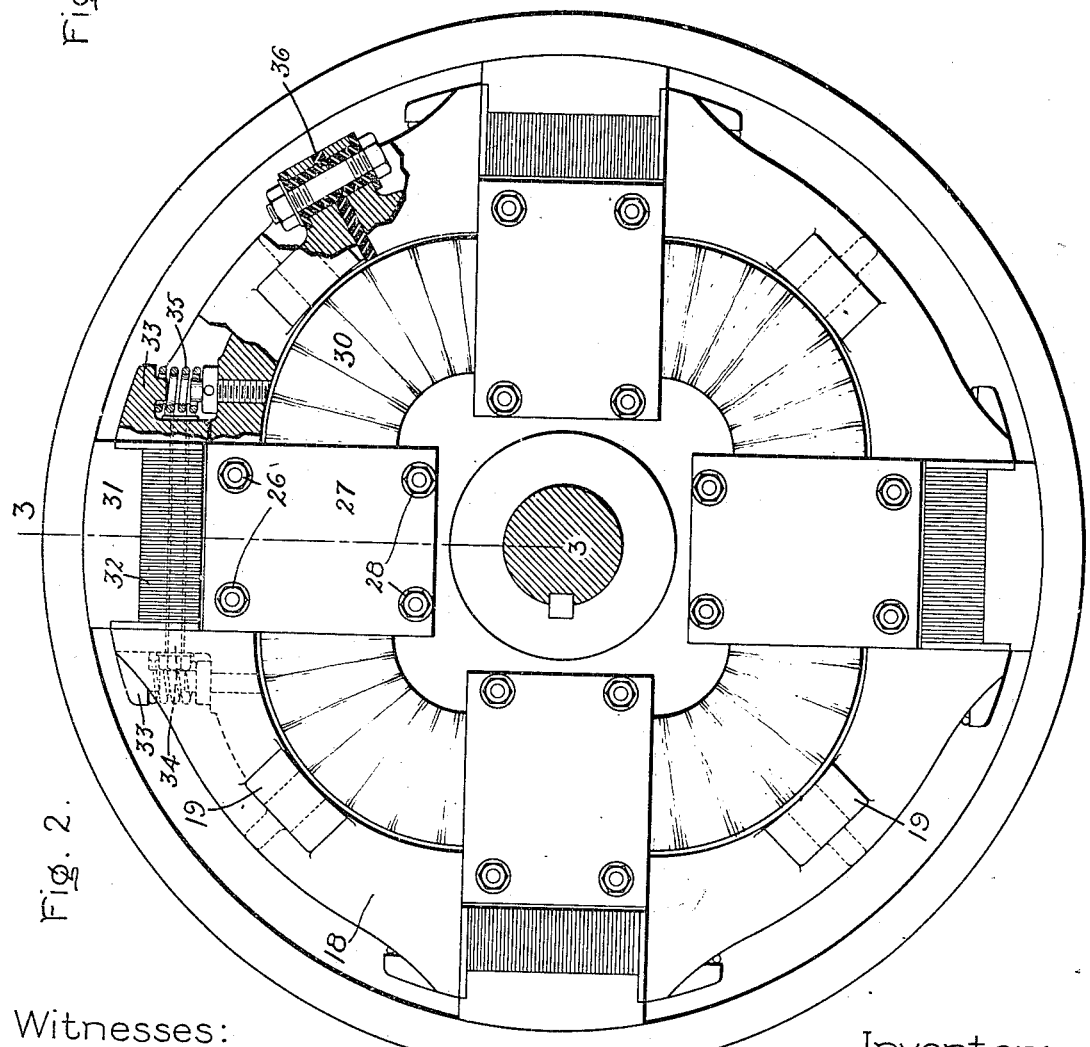

In said drawings, Figure 1 is an elevation illustrating a brake embodying the features of the invention applied to an electric motor. Fig. 2 is a side view of the brake mechanism viewed from the left in Fig. 1, and Fig. 3 is a sectional view illustrating the rotatable element of the brake in section and a portion of the fixed element in section on the line 3 3 of Fig. 2.

Throughout the figures like characters refer to like parts.

The electric motor to which I have shown my brake applied is of the inclosed or ironclad type, in which a casing 10, provided with heads 11 12, completely incloses the field-coils and armature of the motor, the heads being provided with bearings 13 14 for the armature-shaft 15. To the end of this shaft is securely keyed a flanged member 16, which constitutes the rotatable element of the brake. As clearly illustrated, the flange 17 of the member 16 extends toward the casing 10 of the motor, so as to fully protect the interior parts of the brake. The other element of the brake comprises a fixed member 18, of non-magnetic metal, which is provided with four laterally-projecting lugs 19, through which it is adapted to be connected to the head 12 of the motor-casing. This connection may be made in any desired manner, and in the present case I have shown the lugs 19 bolted to coöperating lugs 20 on the motor-head 12.

The fixed member 18 is provided at four points with pole-pieces 24 24, of iron or other magnetic material, which are symmetrically arranged and constitute the pole-pieces of four magnets adapted to draw the friction members 25 out of engagement with the flange 17 of the rotatable member 16. These pole-pieces are built up of laminations and are secured by bolts 26 to the member 18 at one end and through the agency of the exterior plate 27 and bolts 28 are fitted to a yoke 29 at the other end. Located within the space thus formed is an energizing-coil 30, which is concentrically arranged with reference to the member 18 and serves to energize all the magnets of the brake. The friction members 25, which coöperate with the brake-magnets, are each composed of a brake-shoe 31, of wood or other suitable material, and an armature 32, formed of laminations of iron or other magnetic material. The shoe 31 and the armature 32 are securely clamped between the members 33 33 by bolts 34. The members 33 are provided with overhanging portions, between which and corresponding shoulders on the fixed member 18 are located coiled springs 35. These springs are compressed by the action of the magnet in drawing the armatures inward and serve to force the armatures outward when the magnets are deënergized.

From the description thus far it will be seen that when current is supplied to the coil 30 the pole-pieces 24 of each magnet will be magnetized and the shoes 31 will be drawn out of engagement with the flange 17. As soon as the current is cut off, however, the springs 35 will force the shoes 31 outward into engagement with the flange, so as to apply the brakes. By bringing the point of contact of the shoes 31 and the rotatable element of the brake near the periphery of the latter a maximum braking effect is obtainable with a minimum of space for the operating parts. By laminating the pole-pieces 24, armature 32, and yoke 29 the brake may be used with either alternating or direct current. Of course where the brake is intended for use with direct current only the pole-pieces 24, armature 32, and yoke 29 may be solid. It will also be clear that when the coil is supplied with alternating current the fixed member 18 being located so close to the coil would ordinarily form a closed secondary circuit. In order to prevent this, said member is split at one point and the contiguous surfaces separated by suitable insulation 36. This insulation interrupts the electric continuity of the member 18, and thus prevents the induction of a current therein. It is obvious that the coil 30 may be included directly in circuit with the motor or in shunt thereto or in an independent circuit. When included in circuit with the motor, which is a common arrangement, as soon as the motor-current is cut off the coil 30 is deënergized and the brake is applied.

Although I have shown and described my invention as embodied in a magnetic brake, it is clear that the same structure may be employed in clutch mechanism and that many of the features may be employed in other connections without departing from the spirit of my invention.

It will also be clear from the above description that many alterations and modifications may be made in the specific construction illustrated without departing from the spirit of my invention, and I therefore do not wish to be limited to such construction, but aim to cover by the terms of the appended claims all such alterations and modifications.

What I claim as new, and desire to secure by Letters Patent of the United States, is—

1. The combination with a rotatable member and a fixed member, of radially-arranged magnets connected to one of said members, friction members movable relative to said magnets into and out of engagement with the other of said members, and a common energizing-coil for said magnets.

2. The combination with a rotatable member and a fixed member, of radially-arranged magnets connected to said fixed member, friction members movable relative to said magnets into and out of engagement with said rotatable member, and a common energizing-coil for said magnets.

3. The combination with a rotatable member and a fixed member, of radially-arranged magnets connected to said fixed member, friction members radially movable with reference to said magnets into and out of engagement with said rotatable member, and a common energizing-coil for said magnets.

4. The combination with a rotatable member having a laterally-projecting flange, and a fixed member located within said rotatable member, of one or more magnets secured to said fixed member, armatures therefor located between said magnets and said flange, friction-shoes carried by said armatures, and springs for pressing said armatures outward to bring said shoes into engagement with said flange in opposition to the pull of said magnets to disengage said shoes.

5. The combination with a rotatable member having a laterally-projecting flange, and a fixed member located within said rotatable member, of a concentrically-arranged energizing-coil, pole-pieces for one or more magnets secured to said fixed member adjacent to said coil, armatures therefor located between said pole-pieces and said flange, friction-shoes carried by said armatures, and springs for pressing said armatures outward to bring said shoes into engagement with said flange in opposition to the pull of said magnets to disengage said shoes.

6. The combination with a rotatable member having a laterally-projecting flange, and a fixed member located within said rotatable member, of a concentrically-arranged energizing-coil, laminated pole-pieces for one or more magnets lying on opposite sides of said coil, laminated armatures therefor located between said pole-pieces and said flange, friction-shoes carried by said armatures, and springs for pressing said armatures outward to bring said shoes into engagement with said flange in opposition to the pull on said magnets to disengage said shoes.

7. The combination with a rotatable member having a laterally-projecting flange, and a fixed member located within said rotatable member, of a concentrically-arranged energizing-coil located in the plane of and within said fixed member, pole-pieces for a plurality of magnets located adjacent to said coil, and friction members comprising armatures located adjacent to the outer ends of said pole-pieces and movable into and out of engagement with said flange.

8. The combination with a rotatable member having a laterally-projecting flange, and a fixed member located within said rotatable member, of a concentrically-arranged energizing-coil located in the plane of said fixed member, and insulation for breaking the electric continuity of said fixed member, laminated pole-pieces for a plurality of magnets located adjacent to said coil, and friction members comprising laminated armatures located adjacent to the outer end of said pole-pieces and movable into and out of engagement with said flange.

9. The combination with a rotatable member having a laterally-projecting flange, and a fixed member located within said rotatable member, of a concentrically-arranged energizing-coil located in the plane of and within said fixed member, pole-pieces for one or more magnets secured at their outer ends to said fixed member and extending inward on opposite sides of said energizing-coil, and friction members comprising armatures guided within said fixed member and located adjacent to the outer end of said pole-pieces and movable into and out of engagement with said flange.

10. The combination with a rotatable member, a fixed member, and friction-shoes carried by one of said members and adapted to frictionally engage the other, of means for moving said shoes into and out of frictional engagement, comprising a plurality of electromagnets having a common energizing-coil.

11. The combination with a rotatable member, a fixed member, and friction-shoes carried by one of said members and adapted to frictionally engage the other, of means for moving said shoes into and out of frictional engagement, comprising a plurality of concentrically-arranged electromagnets having a common energizing-coil.

12. The combination with a rotatable member, a fixed member, and friction-shoes carried by one of said members and adapted to frictionally engage the other, of means for moving said shoes into and out of frictional engagement, comprising a plurality of radially-arranged electromagnets having a common energizing-coil.

13. The combination with a motor having an inclosing casing, of a flanged rotatable member mounted on the motor-shaft and having its flange extending toward the motor, a fixed member secured to the motor-casing and extending within said flanged member, friction-shoes carried by said fixed member and movable into and out of engagement with said rotatable member, and means for moving said shoes into and out of such engagement.

In witness whereof I have hereunto set my hand this 17th day of February, 1904.

CARL W. LARSON.

Witnesses:
BENJAMIN B. HULL,
HELEN ORFORD.